June 22, 1937. J. C. McCUNE 2,084,696
FLUID PRESSURE BRAKE
Filed Oct. 15, 1936
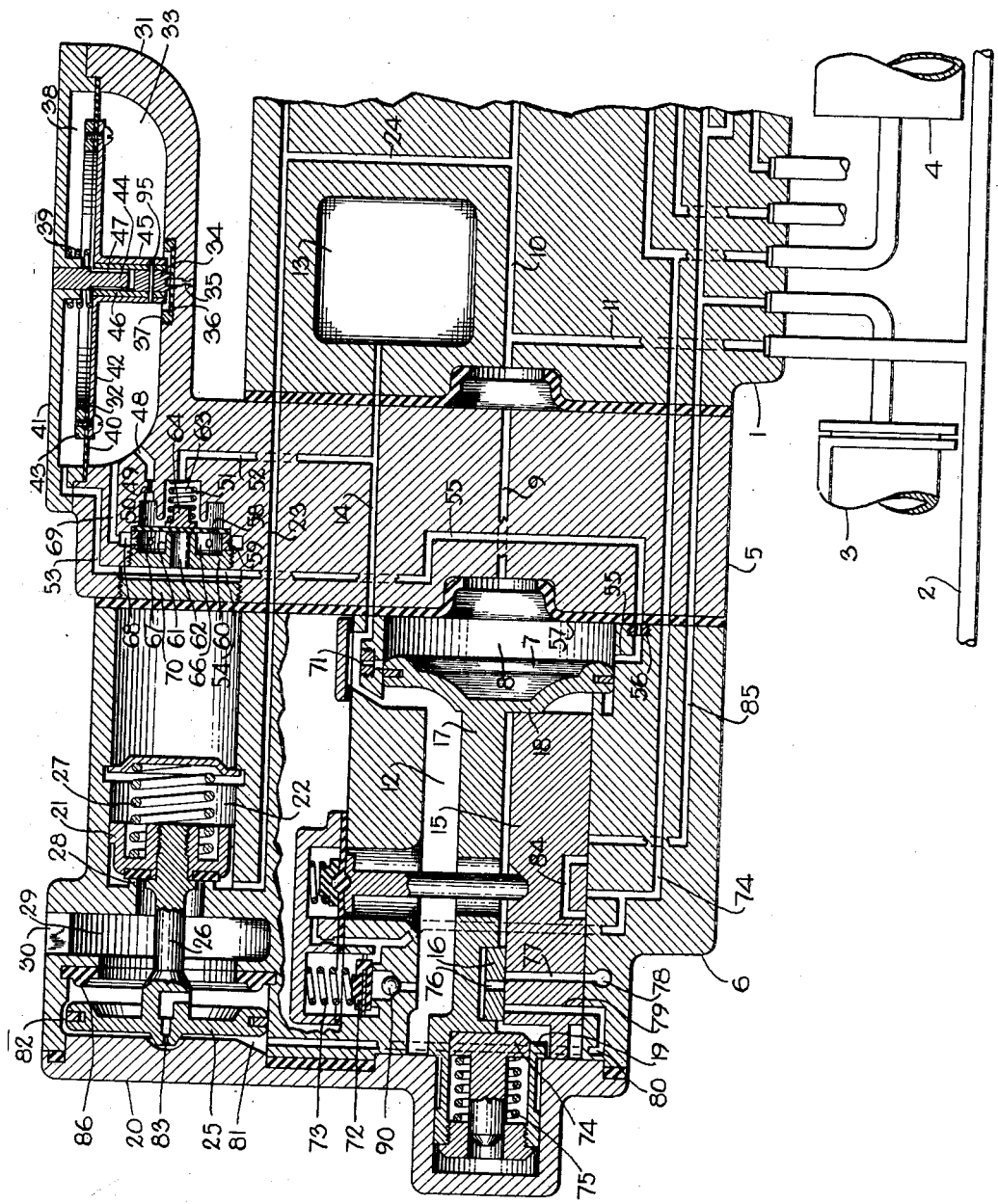
INVENTOR
JOSEPH C. McCUNE
BY Wm. M. Cady
ATTORNEY Patented June 22, 1937

2,084,696

UNITED STATES PATENT OFFICE 2,084,696

FLUID PRESSURE BRAKE

Joseph C. McCune, Edgewood, Pa., assignor to The Westinghouse Air Brake Company, Wilmerding, Pa., a corporation of Pennsylvania Application October 15, 1936, Serial No. 105,639

13 Claims. (Cl. 303—42)

This invention relates to fluid pressure brake equipment and more particularly to the type adapted to operate upon a reduction in brake pipe pressure to effect an application of the brakes.

In my pending application Serial No. 49,335 filed November 12, 1935, there is disclosed an emergency valve device and means associated therewith adapted to prevent undesired emergency operation thereof upon a service reduction in brake pipe pressure.

The emergency valve device comprises a piston subject to the opposing pressures of the brake pipe and a quick action chamber and an auxiliary slide valve adapted to be moved by said piston to a service position upon a service reduction in brake pipe pressure and to an emergency position upon an emergency reduction in brake pipe pressure. A certain differential of pressures, such as .4 of a pound, is normally required on the piston in order to move the auxiliary slide valve to service position. In service position a spring becomes effective to oppose further movement of the piston and a communication is established through the auxiliary slide valve through which the pressure of fluid in the quick action chamber is adapted to reduce at substantially the same rate as the brake pipe pressure is reduced upon a service reduction so as to prevent a sufficient differential of pressures being developed on the piston to overcome said spring.

The quick action chamber vent communication opened in the service position of the auxiliary slide valve is so restricted, that upon an emergency reduction in brake pipe pressure, the quick action chamber pressure is unable to reduce as fast as brake pipe pressure, so that a sufficient differential between brake pipe and quick action chamber pressures, such as one pound, is obtained on the emergency piston to overcome the pressure of the spring which becomes effective in service position and move the auxiliary slide valve to emergency position in which an emergency application of the brakes is initiated.

If, due to accumulations of foreign matter or the like on or around the emergency piston the static resistance to movement thereof becomes such that a differential of pressures such as would be liable to move said piston to emergency position is required to start said piston moving, then just before such a differential is obtained, the means for preventing undesired emergency operation of the emergency valve device acts to vent fluid under pressure from the quick action chamber at a service rate so as to prevent such differential of pressures from being obtained and thereby prevent operation of said emergency valve device to effect an emergency application of the brakes upon a service reduction in brake pipe pressure.

The means for preventing undesired emergency operation of the emergency valve device comprises a flexible diaphragm having a chamber at one side normally in communication with the brake pipe. The diaphragm has at the opposite side a chamber in constant communication with the quick action chamber and containing a valve which is adapted to be operated by the diaphragm upon a reduction in brake pipe pressure to vent fluid under pressure from said chamber and thereby the quick action chamber at a service rate. A biasing spring is provided to act with brake pipe pressure on one side of the diaphragm to control the differential of pressures at which the diaphragm operates.

Communication between the chamber at the brake pipe side of the flexible diaphragm and the brake pipe is controlled by the emergency piston, being open in the normal position of the piston, while in the emergency position of the piston said chamber is disconnected from the brake pipe and connected to the quick action chamber so as to balance the fluid pressures on the diaphragm and permit the biasing spring to hold the diaphragm controlled valve seated and thereby prevent venting of fluid under pressure from the quick action chamber when the emergency piston is in emergency position.

In the construction just described, the communication between the brake pipe and the chamber at the brake pipe side of the flexible diaphragm is sufficiently large, that the pressure in said chamber will reduce substantially with that acting on the emergency piston upon an emergency reduction in brake pipe pressure, and since the diaphragm controlled valve device is designed to be operated by a lower differential of fluid pressures than is required to move the emergency piston to emergency position, or out of its normal position in case of high static friction of the piston, it will be evident that upon an emergency reduction in brake pipe pressure, the flexible diaphragm will deflect in the direction of reducing brake pipe pressure and open the valve controlled thereby so that fluid under pressure will start venting from the quick action chamber. This venting of fluid under pressure from the quick action chamber will be only momentary since it is so restricted with respect to the emergency reduction in brake pipe pressure, that the differential required on the emergency piston to move same to emergency position will be promptly obtained. Movement of the emergency piston to emergency position will then balance the fluid pressures on the diaphragm and permit the biasing spring to seat the valve controlled thereby so as to cut off the venting of fluid under pressure from the quick action chamber by way of said valve.

The deflection of the flexible diaphragm upon an emergency reduction in brake pipe pressure displaces a certain amount of fluid under pressure back into the emergency piston chamber and thereby brake pipe which therein acts to delay obtaining the required differential of pressures on the emergency piston to move same to emergency position. Further, the momentary opening of the valve controlled by the diaphragm effects a reduction in quick action chamber pressure, which, even though slight, also acts to delay obtaining sufficient differential of pressures on the emergency piston to move it to emergency position.

The combined effect of this slight displacement of fluid under pressure into the emergency piston chamber and brake pipe, and the slight momentary venting of fluid under pressure from the quick action chamber acts to delay response of the emergency valve device to an emergency reduction in brake pipe pressure, and this delay results in a materially lower rate of serial transmission of emergency action through a train than would otherwise be obtained, and one object of the invention is to provide an improved equipment of the above type which will respond more quickly to an emergency reduction in brake pipe pressure and thereby act to transmit emergency action through a train at a faster rate than the equipment above described.

Other objects and advantages will be apparent from the following more detailed description of the invention.

In the accompanying drawing, the single figure is a diagrammatic view, mainly in section, of a portion of a fluid pressure brake equipment embodying the invention.

The portion of the fluid pressure brake equipment shown in the drawing is substantially the same as that disclosed in the aforementioned application and operates in substantially the same manner, in view of which the following description will be limited to only that deemed essential to a comprehensive understanding of the improvements embodying the invention.

As shown in the drawing, the fluid pressure brake equipment comprises a pipe bracket 1 to which is connected the usual brake pipe 2, a brake cylinder 3 and an emergency reservoir 4. The brake cylinder 3 is normally vented to the atmosphere and the emergency reservoir is normally charged with fluid under pressure through apparatus (not shown) which is not pertinent to the invention.

A filler piece 5 is mounted on one face of the pipe bracket 1 and mounted on the filler piece 5 is an emergency valve device 6.

The emergency valve device 6 comprises a casing containing an emergency piston 7 having at one side a chamber 8 in constant communication with brake pipe 2 through passages 9, 10 and 11, and having at the opposite side a valve chamber 12 in constant communication with a quick action chamber 13 through a passage 14. A main slide valve 15 and an auxiliary slide valve 16, mounted on and adapted to be moved relatively to slide valve 15, are disposed in chamber 12. The piston 7 is provided with a stem 17 having a recess in which the auxiliary slide valve 16 is disposed so as to be moved with said stem, while the main slide valve 15 is disposed between and is adapted to be operated by a shoulder 18 on the back of the piston 7 and a shoulder 19 provided on the end of the stem 17.

A brake pipe vent valve device 20 is associated with the emergency valve device 6 and comprises a vent valve 21 contained in a chamber 22 which is connected to the brake pipe 2 through passages 23, 24, 10 and 11, and further comprises an actuating piston 25 connected to said vent valve by means of a stem 26. A spring 27 is provided in chamber 22 for normally seating the vent valve 21 against a seat rib 28 to close communication from chamber 22 to chamber 29 which is open to the atmosphere through a passage 30.

A device is provided in a portion 31 of the filler piece which over hangs the pipe bracket 1 for preventing undesired emergency operation of the emergency valve device 6 upon a service reduction in brake pipe pressure. This device comprises a flexible diaphragm 32 preferably as large or larger in diameter than the emergency piston 7 and having at one side a chamber 33 containing a valve 34 connected to said diaphragm for operation therewith. The valve 34 is provided for controlling communication from chamber 33 to an atmospheric passage containing a choke or restricted portion 35 and said valve has on the seat end an annular seat rib adapted to engage a gasket 36 over an opening extending through said gasket and registering with the restricted passage 34. The gasket 36 is secured in place by a clamping ring 37 secured to the filler piece 5 preferably by screw threaded engagement.

The flexible diaphragm 32 has at the opposite side a chamber 38 containing a bias spring 39 acting on the diaphragm for urging same in the direction for seating the valve 34 against the gasket 36.

The flexible diaphragm 32 comprises a ring like element or annulus 40 made of any suitable flexible material, such as relatively thin rubber, and this annulus is clamped around its outer edge between a shoulder on the overhanging portion 31 of the filler piece and a cover 41 secured to said portion 31. The inner edge of the diaphragm is clamped between a follower plate 42 on one side and a clamping ring 43 on the opposite.

The cover 41 is provided with a depending guide pin 44 arranged in axial alignment with the exhaust passage 35. The follower plate 42 is provided with a depending portion 45 having a bore arranged coaxial with the guide pin 44 and lined with a bushing 46 slidably engaging said guide pin. The valve 34 is secured in the lower end of the bushing 46 by a pin 95 which also secures said bushing to the depending portion 45 of the follower 42. By this construction the valve 34 is maintained at all times in proper working relation with its seat. The guide pin 44 is provided with flutes 47 connecting chamber 38 to the space below the end of the pin 44 so as to prevent a dash pot action between said pin and the parts guided thereby.

The follower plate 42 and its depending portion 45 is preferably made in the form of a casting from relatively light weight material such as aluminum. The bushing 46 is provided in the depending portion 45 to provide a non-corroding, wear resisting surface for engagement with the guide pin 44, and both the bushing 46 and guide pin 44 may be made of any suitable material such as brass or bronze. The valve 34 is also preferably made from a non-corroding material such as stainless steel.

The mass of the flexible diaphragm 32 is therefore relatively small and due to this and its relatively large diameter, a structure is obtained which is adapted to be moved by a differential between the opposing fluid pressures in chambers 33 and 38 which is only a relatively small percentage of the pressure of the control spring 39 which determines the differential of pressures at which said diaphragm will operate to unseat the valve 34. Thus any change in the resistance to deflection of the annulus 40 will have no appreciable effect upon the differential of pressures required to deflect the diaphragm 32.

The chamber 33 at the lower side of the flexible diaphragm 40 is connected to the emergency valve chamber 12 and quick action chamber 13 through passage 48 containing a choke 49, chambers 50 and 51, passage 52 and passage 14. The chamber 38 at the upper side of the diaphragm is normally connected to the brake pipe by way of passage 53, chamber 54 and passage 55 which contains a choke plug 56 and which normally opens into the emergency piston chamber 8. The location at which port 55 opens into the emergency piston chamber is such that just before said piston engages gasket 57 upon movement of said piston to emergency position, as will be hereinafter described, said passage will be opened to the valve chamber 12. The choke plug 56 is preferably placed as close as possible to the emergency piston chamber 8 so that as much of the volume of passage 55 as possible is in open communication with the diaphragm chamber 38 and in effect is a part of the volume of said chamber.

A flexible diaphragm 58 is secured around its edge against a shoulder in the filler piece by a clamping ring 59 which is held in place by a nut 60 having screw threaded engagement with the filler piece. The nut 60 is provided on the face adjacent the diaphragm 58 with a seat rib 61 surrounding a passage 62 which opens to chamber 54. The diaphragm 58 is normally urged into sealing engagement with seat rib 61 by means of a spring 63 which is contained in a chamber 51 and acts against the diaphragm through the medium of a follower 64.

The diaphragm 58 is preferably made of any suitable flexible material having high resistance to rupture as compared to that from which the annulus 40 of diaphragm 32 is made, for reasons which will later be described.

A chamber 66 is formed with the clamping ring 59 as the enclosing wall and centrally of which chamber the seat rib 61 extends and said chamber is open through a plurality of ports 67 in said ring to an annular cavity 68 formed around the outer surface of said ring, said cavity being connected to a passage 69 which leads to diaphragm chamber 33.

The spring 63, follower 64, diaphragm 58, ring 59 and nut 60 are adapted to be inserted through chamber 54 and secured in place when the emergency valve device 6 and gasket 57 are removed from the filler piece 5. After these parts are thus assembled, the open end of chamber 54 is closed by a flush plug 70 secured to the filler piece by screw threaded engagement.

In operation, in order to initially charge the equipment with fluid under pressure, fluid under pressure is supplied to the brake pipe 2 in the usual well known manner and flows therefrom through passages 11, 10 and 9 to the emergency piston chamber 8 and from passage 10 through passages 24 and 23 to the vent valve chamber 22.

With the parts of the emergency valve device in their normal position, fluid under pressure supplied to piston chamber 8 flows through a restricted charging port 71 to passage 14 and from thence in one direction to the emergency valve chamber 12 and in the opposite direction to the quick action chamber 13. Fluid under pressure supplied to passage 14 is also adapted to flow therefrom through passage 52, chambers 51 and 50, choke 49 and passage 48 to diaphragm chamber 33, while diaphragm chamber 38 is adapted to be supplied with fluid at brake pipe pressure supplied from the emergency piston chamber 8 through passage 55 chamber 54 and passage 53. When the brake system becomes fully charged, the pressure of fluid in the emergency valve chamber 12, quick action chamber 13 and diaphragm chamber 33 is equalized through the restricted charging port 71 with the brake pipe pressure acting in piston chamber 8 and diaphragm chamber 38, and this permits the bias spring 39 to maintain the service vent valve 34 seated.

In charging a train it is customary to initially supply fluid to the brake pipe at the head end of the train at a pressure higher than normally carried in order to hasten the charging of the brake equipments at the rear of the train, and then after a certain lapse of time, the pressure of such supply is reduced to that normally carried, whereupon the initial high pressure at the head end of the train reduces by flow towards the rear of the train.

Due, for instance, to the charging operation just described, the pressure in the emergency piston chamber 8 and diaphragm chamber 38 on an equipment at the head end of the train may build up rapidly to a relatively high degree, whereas the restricted charging port 71 prevents a corresponding increase in pressure in the emergency valve chamber 12, quick action chamber 13 and diaphragm chamber 33, so that, under this condition, a relatively high differential is liable to be obtained between the pressures in the brake pipe and quick action chamber.

It is undesirable to subject the flexible diaphragm 32 to a high differential of pressures such as is liable to be obtained under the conditions just described due to the possibility of over stressing or rupturing said diaphragm or due to the possibility of distortion of parts associated therewith or ruining of the valve seat 36.

The maximum differential of pressures which it is possible to obtain on the diaphragm 32 under all conditions is therefore limited to a safe degree, such for instance as 15 pounds, by the action of spring 63 on the diaphragm 58.

The diaphragm 58 normally engages the seat rib 61 and is subject on that side over the area within said seat rib to brake pipe pressure supplied from chamber 54 through passage 62, and over the area outside of said seat rib to quick action chamber pressure in chamber 66. The diaphragm 58 is subject on the opposite side to quick action chamber pressure and that of spring 63. In charging the equipment, if the brake pipe pressure acting within the seat rib 61 becomes increased to a degree, such as 15 pounds, exceeding the opposing pressures of fluid in the quick action chamber, the diaphragm is deflected against spring 63 away from seat rib 61 which permits fluid to flow from chamber 54 to chamber 66 and from thence through ports 67, chamber 68 and passage 69 to diaphragm chamber 33. The pressure of fluid thus supplied to chamber 33 may be substantially equal to that in the brake pipe 2 and therefore higher than in the quick action chamber 13 and emergency valve chamber 12 so that fluid under pressure will then flow from chamber 33 through passage 48, chambers 50 and 51, and passages 52 and 14 to the chambers 13 and 12, but this flow is so restricted by choke 49 with respect to the rate of supply of fluid under pressure to chamber 33, that the pressure obtained in chamber 33 will substantially equal that acting in chamber 38 at the opposite side of the diaphragm 40, so that the diaphragm 40 is therefore placed in substantially equilibrium with respect to opposing fluid pressures. In this manner the diaphragm 40 is protected against being subjected to a differential of forces which would be liable to cause rupture thereof, and other possible difficulties hereinbefore mentioned are avoided.

It will of course be evident that after the diaphragm 58 operates to limit the differential of pressures on the diaphragm 32, said diaphragm 58 is subjected to the differential existing between the brake pipe pressure acting on the left hand face and the quick action chamber pressure acting on the right hand face, and while this differential may become relatively high, the diaphragm 58 is designed to withstand it, whereas the diaphragm 32 could not be so designed and at the same time provide the sensitive structure otherwise desired.

Due to fluid under pressure being supplied to quick action chamber 13 and emergency valve chamber 12 through choke 49 as well as through charging choke 71 when the diaphragm 58 is deflected away from seat rib 61, the pressure in said chambers will tend to increase, during the initial charging period, described above, to a degree higher than normally carried in the brake pipe 2, but this is prevented, since if the pressure in said chambers increases to a degree slightly exceeding that in the emergency reservoir 4, said pressure will first unseat a check valve 90 and then a check valve 72 against the pressure of a light spring 73 and then be dissipated past said check valves and through a passage 76 to said reservoir which is of sufficiently large volume to absorb such flow without becoming overcharged during the short period of time such flow will occur.

When the brake pipe pressure is permitted to reduce to that normally carried, after the initial rapid increase to a relatively high degree, the pressure of fluid acting on the left hand face of the diaphragm 58 also reduces correspondingly, and as soon as this pressure is reduced to a degree where it is slightly less than the opposing pressure of fluid in the quick action chamber 13 and spring 63 acting on the opposite face of the diaphragm, said spring deflects said diaphragm into engagement with seat rib 61. This cuts off the supply of fluid under pressure from the piston chamber 8 past the diaphragm 58 to the diaphragm chamber 33 after which the pressure of fluid in diaphragm chamber 33 equalizes through passages 52 and 14 with that in the emergency valve chamber 12 and quick action chamber 13, all of which then become charged through port 71 with fluid at the normal pressure in the brake pipe 2.

With the equipment charged with fluid under pressure and thus conditioned to operate, when a service reduction in pressure is effected in the brake pipe 2 in the usual well known manner, a corresponding reduction in pressure occurs in the emergency piston chamber 8 and the choke 71 so restricts back flow of fluid under pressure from the emergency valve chamber 12 to piston chamber 8 that a differential of fluid pressures is established on the piston 7.

If the emergency valve device is in condition to operate as intended, then when the brake pipe pressure becomes reduced a degree, such as .4 of a pound, below the pressure in chamber 12, the piston 7 is moved toward the right hand. This movement laps the port 71 so as to prevent back flow of fluid under pressure from the emergency valve chamber 12 and quick action chamber 13 to the brake pipe, and also shifts the auxiliary slide valve 16 to a service position in which a port 76 therein registers with a passage 77 in the main slide valve 15. Through this port and passage fluid under pressure is adapted to be vented from the emergency valve chamber 12 and quick action chamber 13 to the atmosphere by way of an atmospheric passage 78, and such venting of fluid is adapted to reduce the pressure acting on the left hand face of the emergency piston 7 at as fast a rate as the opposing brake pipe pressure in chamber 8 is reduced so as to prevent the differential of pressures on the emergency piston 7 from increasing substantially above that above described.

A plunger 74 subject to the pressure of a spring 75 is provided in the end of the emergency piston stem 17. This plunger is adapted to engage the left hand end of the main slide valve 15 at substantially the time service position of the auxiliary slide valve 16 is reached. Movement of the piston 7 and auxiliary slide valve 16 past the service position therefore necessitates a sufficient increase, such as .6 of a pound, in the differential of pressures on said piston to overcome the pressure of spring 75, but normally such an increase is prevented by the service venting of fluid under pressure from the valve chamber 12 and quick action chamber 13 through ports 76 and 77. A greater differential of pressures is required on piston 7 to move the main slide valve 15 than to move the auxiliary slide valve 16 and compress the spring 75, so that said main slide valve in conjunction with said spring provides an effective block for defining service position of the auxiliary slide valve 16 and for preventing movement thereof past service position upon a service reduction in brake pipe pressure when the piston 8 and auxiliary slide valve 16 are in condition to operate as intended. In service position of the auxiliary slide valve it is desired to point out that an emergency port 79 through the main slide valve 15 is still lapped by the auxiliary slide valve 16.

When, with the emergency valve device 6 in its normal or release position as shown in the drawing, a sudden emergency reduction in brake pipe pressure is effected, the brake pipe reduction in piston chamber 8 is so rapid as to promptly establish a sufficient differential of fluid pressures on the emergency piston 7 as to cause said piston to move toward the right hand. In thus moving, the auxiliary slide valve 16 is first shifted to service position in which the service ports 76 and 77 are in registry, but the service venting of fluid under pressure from the valve chamber 12 and quick action chamber 13 through these ports is so restricted with respect to the rapid reduction in brake pipe pressure, that the differential of pressures on the piston 7 promptly increases to a degree, such as one pound, sufficient to overcome the pressure of spring 75 whereupon the piston 7 moves the auxiliary slide valve 16 to emergency position which is defined by engagement of shoulder 19 on the piston stem 17 with the left hand end of the main slide valve 15.

In the emergency position of the auxiliary slide valve 16, the emergency port 79 is uncovered which permits fluid under pressure to flow from the valve chamber 12 and quick action chamber 13 to a passage 80 and through said passage to chamber 81 at the left hand face of the vent valve piston 25.

The rate at which fluid under pressure is thus supplied to chamber 81 exceeds the venting capacity of a leakage groove 82 around the piston 25 and a timing port 83 through said piston so that a pressure is built up on said piston which moves same towards the right hand into sealing engagement with a gasket 86.

This movement of the vent valve piston 25 shifts the brake pipe vent valve 21 away from seat rib 28 whereupon the fluid under pressure in the brake pipe 2 and emergency piston chamber 8 is suddenly vented to the atmosphere through passages 11 and 9 to passage 10 and from thence through passages 24, 23, chambers 22 and 29 and atmospheric passage 30. The consequent reduction in pressure in piston chamber 8 ensures a sufficient differential of pressures on said piston to overcome the static friction of the main slide valve 15 and move said slide valve to its emergency position which is defined by the engagement of the piston 7 with the gasket 57.

In emergency position of slide valve 15, the passage 80 is uncovered thereby and opened directly to the valve chamber 12 so as to maintain the supply of fluid under pressure from said chamber and the quick action chamber 13 to the vent valve piston chamber 81. Also, a cavity 84 in the main slide valve 15 connects the emergency reservoir passage 74 to a passage 85 which leads to the brake cylinder 3, so that fluid under pressure is permitted to equalize from the emergency reservoir 4 into said brake cylinder for effecting an emergency application of the brakes.

With the vent valve piston 25 sealing against gasket 86, the pressure of fluid in the chamber 81 is gradually reduced through the timing port 83 which is of such size with respect to the combined volumes of the emergency valve chamber 12 and quick action chamber 13 that a sufficient pressure will be maintained on said piston to hold the vent valve 21 unseated against the pressure of spring 27 long enough to permit substantially complete venting of fluid under pressure from the brake pipe 2, after which the spring 27 acts to seat the vent valve 21 so that the brake pipe may be recharged for effecting a release of the brakes, whenever it is desired to do so.

It will be noted that, since chamber 38 at one side of the flexible diaphragm 32 is normally connected through passage 55 to the emergency piston chamber 8 and thereby to the brake pipe 2, the pressure in chamber 38 will be reduced with brake pipe pressure upon a service reduction in brake pipe pressure and thereby establish on the diaphragm 32 the same differential of pressures as established on the emergency piston 7. If the emergency piston 7 responds to a reduction in brake pipe pressure at a service rate and moves the auxiliary slide valve 16 to service position before sufficient differential is obtained thereon to overcome the pressure of spring 75 and move the auxiliary slide valve 16 to its emergency position, the service venting of fluid under pressure from the valve chamber 12 and quick action chamber 13 will limit the differential obtained on the diaphragm 32 to a degree such that the pressure of spring 39 will prevent deflection thereof.

The value of spring 39 is such however as to permit the diaphragm 32 to be deflected by a differential of pressures slightly less than required on the piston 7 to move the auxiliary slide valve 16 to emergency position, so that in case the static frictional resistance to movement of said piston should become increased, due for instance to foreign matter on or around the piston, to a degree such that the differential of pressures required on the piston to start it moving would be liable to cause it to move through the service position to emergency position upon a service reduction in brake pipe pressure, the diaphragm 32 will be deflected against the opposing pressure of spring 39 and pull the service vent valve 34 away from its seat.

With the service vent valve 34 unseated, fluid under pressure is then vented from the emergency valve chamber 12 and quick action chamber 13 by way of passages 14 and 52, chambers 51 and 50, passage 48, chamber 33 and through the restricted vent port 35 to the atmosphere at a service rate and this prevents the differential of pressures increasing on the emergency piston to a degree which would be liable to cause the piston 7 to move the auxiliary slide valve 16 to emergency position and thereby initiate an emergency application of the brakes upon a service reduction in brake pipe pressure.

The choke 49 in passage 48 is sufficiently large to permit the pressure in diaphragm chamber 33 to remain substantially equal to that in the valve chamber 12 and quick action chamber 13 when the service vent valve 34 is open so that the diaphragm 32 will remain subject to the same pressures as acting on the emergency piston during such operation.

It is unnecessary to have the flexible diaphragm 32 operate the service vent valve 34 upon an emergency reduction in brake pipe pressure, since, regardless of the friction condition of the emergency piston 7, such a reduction promptly provides sufficient differential of pressures on said piston 7 to operate same to move the auxiliary slide valve 16 to its emergency position for initiating operation of the brake pipe vent valve device 20. Furthermore, it is undesirable to have the flexible diaphragm 32 even deflect and unseat the service vent valve 34 upon an emergency reduction in brake pipe pressure, since such deflection would displace a certain amount of fluid under pressure from chamber 38 back into the emergency piston chamber 8 and consequently delay obtaining the required differential on the emergency piston 7 to move same to emergency position, while the undesired unseating of the service vent valve 34, though only momentary, would act to reduce the pressure in the emergency valve chamber 12 and quick action chamber 13 and further delay obtaining said differential. Such delay in obtaining the differential required to move the emergency piston 7 and slide valve 16 to emergency position on each car in a train would result in a slower serial transmission of emergency action through a train than is desired and according to the invention is avoided by the use of the choke 56 in passage 55.

This choke 56 permits flow of fluid under pressure from chamber 38 through passage 55 to piston chamber 8 at a service rate upon a service reduction in brake pipe pressure, but when the brake pipe pressure is reduced at an emergency rate, the choke 56 so retards the flow of fluid under pressure from chamber 38 back to piston chamber 8 that sufficient differential of pressures is obtained on piston 7 to move said piston to the emergency position in which it engages gasket 57, before a sufficient differential of pressures is obtained on the diaphragm 32 to cause it to deflect and unseat the service vent valve 34. Just before the piston 7 engages the gasket 57, it over travels passage 55 sufficiently that said passage is opened to the valve chamber 12 which permits fluid under pressure therefrom to flow through said passage to diaphragm chamber 33, and since the diaphragm chamber 33 is also supplied with fluid at the pressure in valve chamber 12, it will be evident that the opposing fluid pressures on diaphragm 32 are then balanced which permits spring 39 to maintain the valve 34 seated. By thus preventing any fluid being vented from valve chamber 12 past the service vent valve 34 upon an emergency reduction in brake pipe pressure all fluid in valve chamber 12 and quick action chamber 13 is employed for holding the vent valve piston 25 and thereby vent valve 21 in the brake pipe venting position for the desired period of time.

From the above description it will now be evident that improved valve means are provided for preventing undesired emergency operation of an emergency valve device upon a service reduction in brake pipe pressure and means are provided for preventing operation of said valve means upon an emergency reduction in brake pipe pressure so that said valve means will not delay the response of said emergency valve device to an emergency reduction in brake pipe pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, in combination, a brake pipe, an emergency valve device subject to the opposing pressures of the brake pipe and a quick action chamber and operative upon an emergency reduction in brake pipe pressure to effect an emergency application of the brakes, valve means responsive to a service reduction in brake pipe pressure to vent fluid under pressure from said quick action chamber to prevent said emergency valve device from operating upon a service reduction in brake pipe pressure, and means operative to prevent movement of said valve means upon an emergency reduction in brake pipe pressure.

2. In a fluid pressure brake, in combination, a brake pipe, an emergency valve device subject to the opposing pressures of the brake pipe and a quick action chamber and operative upon an emergency reduction in brake pipe pressure to effect an emergency application of the brakes, valve means responsive to a service reduction in brake pipe pressure to vent fluid under pressure from said quick action chamber to prevent said emergency valve device from operating upon a service reduction in brake pipe pressure, and means including said emergency valve device and operative upon an emergency reduction in brake pipe pressure to prevent said valve means operating to vent fluid under pressure from said quick action chamber.

3. In a fluid pressure brake, in combination, a brake pipe, an emergency valve device subject to the opposing pressures of the brake pipe and a quick action chamber and operative upon an emergency reduction in brake pipe pressure to effect an emergency application of the brakes, valve means subject to the opposing pressures of said brake pipe and quick action chamber and operative upon a service reduction in brake pipe pressure to vent fluid under pressure from said quick action chamber at a predetermined rate, and means including said emergency valve device controlling communication between said brake pipe and valve means and operative upon an emergency reduction in brake pipe pressure to prevent operation of said valve means.

4. In a fluid pressure brake, in combination, a brake pipe, an emergency valve device subject to the opposing pressures of the brake pipe and a quick action chamber and operative upon an emergency reduction in brake pipe pressure to effect an emergency application of the brakes, valve means subject to the opposing pressures of said brake pipe and quick action chamber and operative upon a service reduction in brake pipe pressure to vent fluid under pressure from said quick action chamber at a predetermined rate, and a flow restricting means in the communication between said valve means and the brake pipe operative upon an emergency reduction in brake pipe pressure to limit the reduction in brake pipe pressure on said valve means.

5. In a fluid pressure brake, in combination, a brake pipe, an emergency valve device subject to the opposing pressures of the brake pipe and a quick action chamber and operative upon an emergency reduction in brake pipe pressure to effect an emergency application of the brakes, valve means normally subject to the opposing pressures of said brake pipe and quick action chamber and operative upon a service reduction in brake pipe pressure to prevent operation of said emergency valve device upon a service reduction in brake pipe pressure, said emergency valve device being operative upon movement to effect an emergency application of the brakes to balance the opposing fluid pressures on said valve means to prevent operation thereof to effect venting of fluid under pressure from said quick action chamber, and means operative upon an emergency reduction in brake pipe pressure to prevent operation of said valve means until said emergency valve device moves to the position for preventing operation of said valve means.

6. In a fluid pressure brake, in combination, a brake pipe, an emergency valve device subject to the opposing pressures of said brake pipe and a quick action chamber and operative upon an emergency reduction in brake pipe pressure to effect an emergency application of the brakes, a valve operative to vent fluid under pressure from said quick action chamber at a service rate, flexible diaphragm means subject to the opposing pressures of said brake pipe and quick action chamber and operative upon a service reduction in brake pipe pressure to effect the operation of said valve, and means including said emergency valve device and operative upon an emergency reduction in brake pipe pressure to prevent operation of said diaphragm means to operate said valve upon an emergency reduction in brake pipe pressure.

7. In a fluid pressure brake, in combination, a brake pipe, and emergency valve device subject to the opposing pressures of said brake pipe and a quick action chamber and operative upon an emergency reduction in brake pipe pressure to effect an emergency application of the brakes, a valve operative to vent fluid under pressure from said quick action chamber at a service rate, flexible diaphragm means subject to the opposing pressures of said brake pipe and quick action chamber and operative upon a service reduction in brake pipe pressure to effect the operation of said valve, said emergency valve device being operative upon movement to effect an emergency application of the brakes to balance the opposing fluid pressures on said diaphragm means to prevent the application thereof, and a choke in the communication between said brake pipe and diaphragm means operative to prevent operation thereof upon an emergency reduction in brake pipe pressure until movement of said emergency valve device balances the opposing fluid pressures on said diaphragm means.

8. In a fluid pressure brake, in combination, a brake pipe, an emergency valve device subject to the opposing pressures of said brake pipe and a quick action chamber and adapted to be operated upon the creation of a certain differential between brake pipe and quick action chamber pressures upon a service reduction in brake pipe pressure to effect a service reduction in pressure in said quick action chamber, and upon the creation of a greater differential between said pressures upon an emergency reduction in brake pipe pressure to effect an emergency application of the brakes, valve means subject to the opposing pressures of said brake pipe and quick action chamber and operative to effect a service reduction in pressure in said quick action chamber upon a service reduction in brake pipe pressure when a differential greater than said certain differential but less than said greater differential is established between the opposing pressures, and means operative upon an emergency reduction in brake pipe pressure to prevent a differential of pressures being established on said valve means equal to said certain differential.

9. In a fluid pressure brake, in combination, an emergency valve device subject to the opposing pressures of said brake pipe and a quick action chamber and operative upon a reduction in brake pipe pressure when a differential is obtained between said opposing pressures which exceeds a predetermined degree to effect an emergency application of the brakes, valve means controlled by said opposing pressures and operative by a differential of pressures less than said predetermined degree to vent fluid under pressure from said quick action chamber at a service rate to prevent operation of said valve device upon a service reduction in brake pipe pressure, said emergency valve device being operative when effecting an emergency application of the brakes to render said valve means ineffective to vent fluid under pressure from said quick action chamber, and means operative upon an emergency reduction in brake pipe pressure to render said valve means ineffective until said emergency valve device is in the position for effecting an emergency application of the brakes.

10. In a fluid pressure brake, in combination, an emergency valve device subject to the opposing pressures of said brake pipe and a quick action chamber and operative upon a reduction in brake pipe pressure when a differential is obtained between said opposing pressures which exceeds a predetermined degree to effect an emergency application of the brakes, a valve operative to vent fluid under pressure from said quick action chamber at a service rate to prevent obtaining said predetermined differential of pressures upon a service reduction in brake pipe pressure, a flexible diaphragm subject to the opposing pressures of said brake pipe and quick action chamber and operative upon a service reduction in brake pipe pressure when a differential less than said predetermined differential is established between said opposing pressures to operate said valve, said emergency valve device comprising a piston subject to said opposing pressures and controlling communication from said brake pipe to a passage leading to said flexible diaphragm and operative upon movement to effect an emergency application of the brakes to close said communication and connect said passage to quick action chamber whereby the opposing fluid pressures on said diaphragm are balanced to prevent operation of said diaphragm to operate said valve, and a choke in said passage operative upon an emergency reduction in brake pipe pressure to restrict flow of fluid from said diaphragm to said brake pipe to a degree sufficient to prevent operation of said diaphragm before said piston moves to connect said passage to said quick action chamber.

11. In a fluid pressure brake, in combination, a brake pipe, a first flexible diaphragm subject on one face to brake pipe pressure and on the opposite face to the pressure of fluid in a chamber adapted to be charged with fluid under pressure from the brake pipe than a restricted port, a second flexible diaphragm subject on one face to brake pipe pressure and on the opposite face to the pressure of fluid in said chamber plus the pressure of a spring, said second diaphragm being operative when, upon charging the brake pipe with fluid under pressure, the brake pipe pressure acting on the one face exceeds the opposing pressure to open a communication through which fluid under pressure is supplied from the brake pipe to said opposite face of the first mentioned diaphragm for limiting the differential of pressures thereon to a degree controlled by the pressure of said spring on the second diaphragm.

12. In a fluid pressure brake, in combination, a brake pipe, a first flexible diaphragm subject on one face to brake pipe pressure and on the opposite face to the pressure of fluid in a chamber connected through a choke to a volume adapted to be charged with fluid under pressure from the brake pipe through a restricted port, a second flexible diaphragm subject on one face to brake pipe pressure and on the opposite face to the pressure of fluid in said volume plus the pressure of a spring, said second diaphragm being operative when upon charging the brake pipe with fluid under pressure, the brake pipe pressure on one face exceeds the opposing pressure to open communication from said brake pipe to said chamber through which fluid may flow from the brake pipe to said chamber at a faster rate than fluid can flow from said chamber to said volume, whereby the differential of pressures obtained on the first diaphragm upon an increase in brake pipe pressure is limited to a degree controlled by the pressure of said spring on said second diaphragm.

13. In a fluid pressure brake, in combination, a brake pipe, a first flexible diaphragm of relatively thin flexible material and having a relatively large area subject on one face to brake pipe pressure and on the opposite face to the pressure of fluid in a chamber adapted to be charged with fluid under pressure from the brake pipe through a restricted port, a second flexible diaphragm having greater resistance to rupture than the first diaphragm and having a relatively small area subject to the opposing pressures of the brake pipe on one side and the pressure of fluid in said chamber plus the pressure of a spring on the opposite side, the second diaphragm being operative when upon charging the brake pipe with fluid under pressure, the brake pipe pressure on the one side exceeds the opposing pressure to open a communication through which fluid under pressure is adapted to be supplied from the brake pipe to said opposite face of the first flexible diaphragm for limiting the differential of pressures on the first diaphragm to a degree controlled by the pressure of said spring on the second diaphragm.

JOSEPH C. McCUNE.